United States Patent [19]

Runge et al.

[11] Patent Number: 5,429,338
[45] Date of Patent: Jul. 4, 1995

[54] EQUIPMENT MOUNT

[75] Inventors: Sam A. Runge, Suffolk; Han D. Phan, Hampton, both of Va.

[73] Assignee: Newport News Shipbuilding and Dry Dock Company, Newport News, Va.

[21] Appl. No.: 105,516

[22] Filed: Aug. 11, 1993

[51] Int. Cl.⁶ ............................................. F16M 13/00
[52] U.S. Cl. ...................... 248/583; 248/618; 248/632; 267/140.5; 267/205
[58] Field of Search ............... 248/580, 581, 583, 610, 248/613, 632, 634, 635, 638; 267/141.2, 140.5, 134, 201, 205

[56] References Cited

U.S. PATENT DOCUMENTS

| 1,169,863 | 2/1916 | Peycke | 267/205 |
|---|---|---|---|
| 2,306,392 | 12/1942 | Light | 267/201 |
| 2,570,370 | 10/1951 | O'Connor | 267/201 |
| 3,285,594 | 11/1966 | La Belle | 267/201 |
| 4,033,533 | 7/1977 | Evrard | 248/632 |

FOREIGN PATENT DOCUMENTS

| 1104987 | 4/1961 | Germany | 267/205 |
|---|---|---|---|
| 1152126 | 8/1963 | Germany | 267/141.1 |
| 3287405 | 12/1991 | Japan | 267/141.1 |
| 1284536 | 8/1972 | United Kingdom | 267/205 |
| 1490339 | 6/1989 | U.S.S.R. | 267/141.1 |

*Primary Examiner*—Alvin C. Chin-Shue
*Assistant Examiner*—Derek J. Berger
*Attorney, Agent, or Firm*—Lalos & Keegan

[57] ABSTRACT

An equipment mount for isolating equipment from shock loads and acoustic vibrations has a ring-shaped base mounted to a foundation. A generally cylindrical retainer has an X-shaped cross section and a pair of contact surfaces forming the X-shaped cross section and disposed at an angle relative to the axis of the retainer. The retainer is movable relative to the base. A generally cylindrical resilient member is disposed between the base and the retainer. The resilient member includes a kick segment at either end thereof projecting outwardly at an angle relative to the axis of the resilient member and having an end contacting one of the retainer contact surfaces when free standing. The resilient member is deformable under load so that a greater portion of at least one of the kick segments contacts at least one of the retainer contact surfaces to isolate the equipment from the load.

55 Claims, 6 Drawing Sheets

FORCE-DEFLECTION CURVE

EQUIPMENT MOUNT

BACKGROUND OF THE INVENTION

This invention relates to an equipment mount for isolating large equipment or systems of equipment from shock loads and small amplitude acoustic vibrations.

To minimize the transmission of small amplitude vibrations into the surrounding water, shipboard equipment and/or equipment platforms are currently mounted on resilient mounts. A typical large capacity (5,000 or 10,000 pounds) mount comprises three separate elements: a compression element, a shear element, and a shock snubber. The compression element provides vibration isolation in the axial direction while the shear element provides isolation in the transverse directions. The compression and shear elements must be used together since neither can individually provide adequate isolation in all directions.

The standard resilient mount stiffness must be sufficiently low (typically 5 Hertz) to ensure adequate attenuation of input excitations. A mount with a sufficiently low stiffness to handle such excitations, however, is not stiff enough to compensate for shock loads, that is, loads typically experienced in battle conditions. Thus, equipment mounted with the standard resilient mount would experience large deflections when subjected to shock load. To address this problem, shock snubbers are typically installed in conjunction with the compression and shear elements. Shock snubbers physically limit the displacement excursion of the equipment under shock. Snubbers are not shock isolators and do not provide any shock attenuation. Thus, equipment intended to be mounted on the prior art resilient equipment mount must therefore be designed to withstand large shock accelerations.

SUMMARY OF THE INVENTION

The present invention has been devised to provide shock and vibration isolation of large equipment or systems of equipment from multidirectional dynamic loads. Like the prior art, the mount of the present invention is capable of satisfactorily attenuating small amplitude vibrations. Unlike the prior art, however, the mount of the present invention is also designed to isolate equipment from shock loads. The mount reduces the shock load experienced by the equipment by a factor of 5 to 10 below the current practice, depending on the mass of the equipment.

The equipment mount of the present invention comprises three components: a base mounted to a foundation, a generally cylindrical retainer including a flange to which the equipment is mounted, and a generally cylindrical resilient member disposed between the base and the retainer. The resilient member and its retainer are shaped to provide shock isolation over a large displacement range, i.e., 1 to 3 inches, regardless of the direction of the shock. The mount provides a distinct change in stiffness as a function of the displacement amplitude. At smaller amplitude vibrations, the mount provides a first lower stiffness. The lower stiffness is required to attenuate small amplitude vibrations during normal conditions. The stiffness increases when a large excursion occurs under shock, i.e., when the mount is displaced by an amount greater than a predetermined displacement.

DESCRIPTION OF THE PREFERRED EMBODIMENTS

Figure 1:
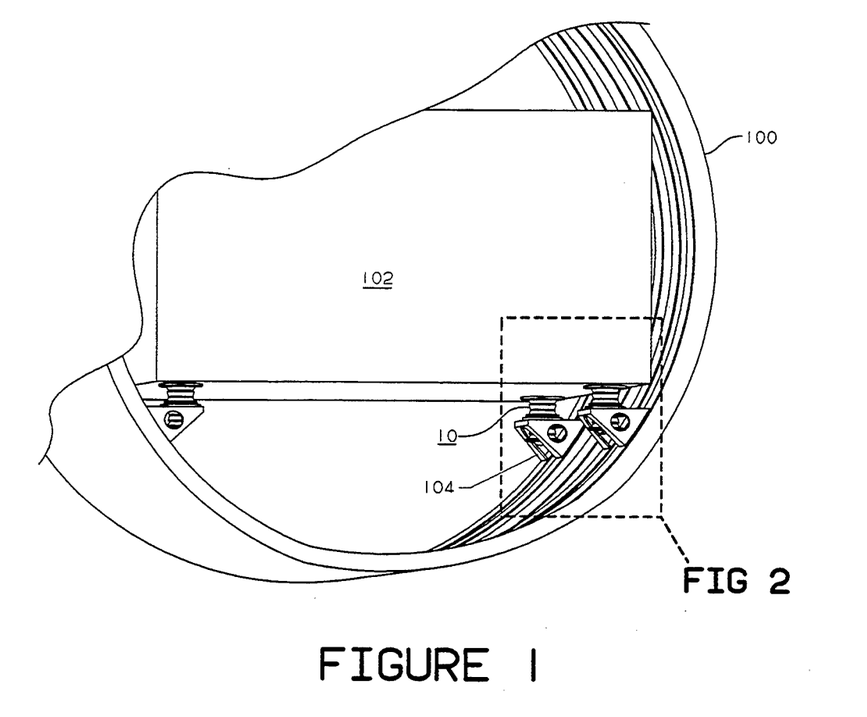
FIG. 1 is a perspective view of an arrangement utilizing the preferred embodiment of the present invention in a ship.
Figure 2:
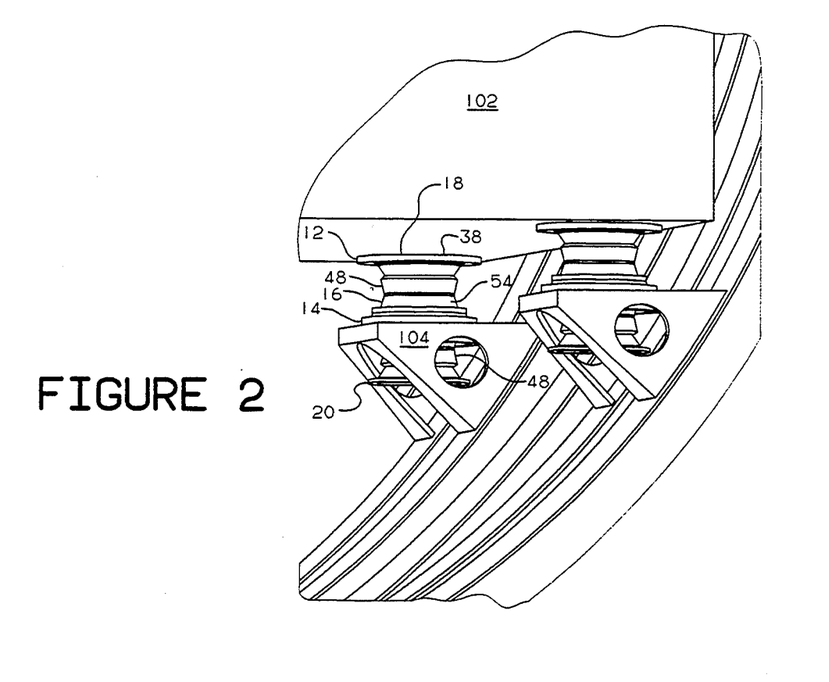
FIG. 2 is an enlarged view of the embodiment of FIG. 1.

Referring to the illustration of the present invention shown in FIGS. 1–6, a typical environment in which the invention is to be used is shown in FIG. 1. A mount, shown generally as 10, is utilized to isolate shock and vibration loads for a load 102, such as an equipment platform and associated equipment, mounted inside a ship 100. As seen in FIG. 2, mount 10 generally includes a retainer 12, a base 14, and a resilient member 16 disposed between retainer 12 and base 14. A foundation 104 secured to the ship 100 is provided. The load 102 is mounted to retainer 12 of mount 10, while the base 14 is secured to the foundation 104. Alternatively, the load 102 may be mounted to the base 14 while the foundation 104 is attached to the retainer 12. Preferably, a minimum of four isolators is used to isolate an equipment platform.

Figure 3:
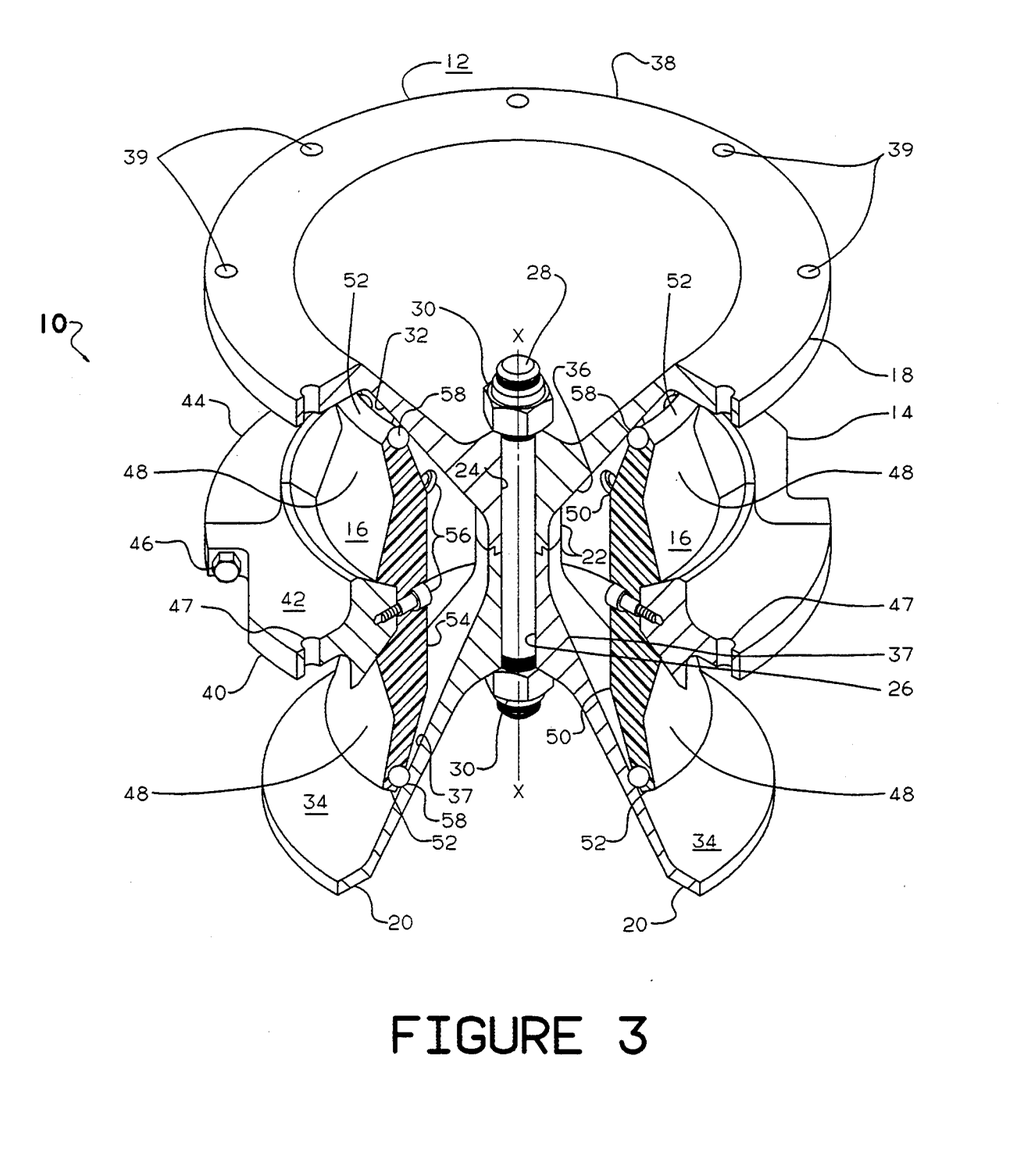
FIG. 3 is a perspective, partial cross-sectional view of the mount assembly shown in FIGS. 1 and 2.

Turning to FIG. 3, a preferred embodiment of the invention is shown in detail. Retainer 12 preferably comprises an upper retainer 18 and a lower retainer 20. Each of the upper and lower retainers 18 and 20 is approximately shaped like a cone and is disposed relative to one another with the tips 22 of the cones adjacent to one another. Each of the upper and lower retainers 18 and 20 further includes a through hole 24 and 26, respectively. The retainers are secured to one another by means of a single bolt 28 received in through holes 24 and 26, with a pair of self-locking nuts 30 at both ends thereof. Upper retainer 18 further includes an upper flange 38 including a plurality of mounting holes 39 spaced circumferentially therein. Mounting holes 39 can accommodate either the load 102 or the foundation 104.

Figure 4:
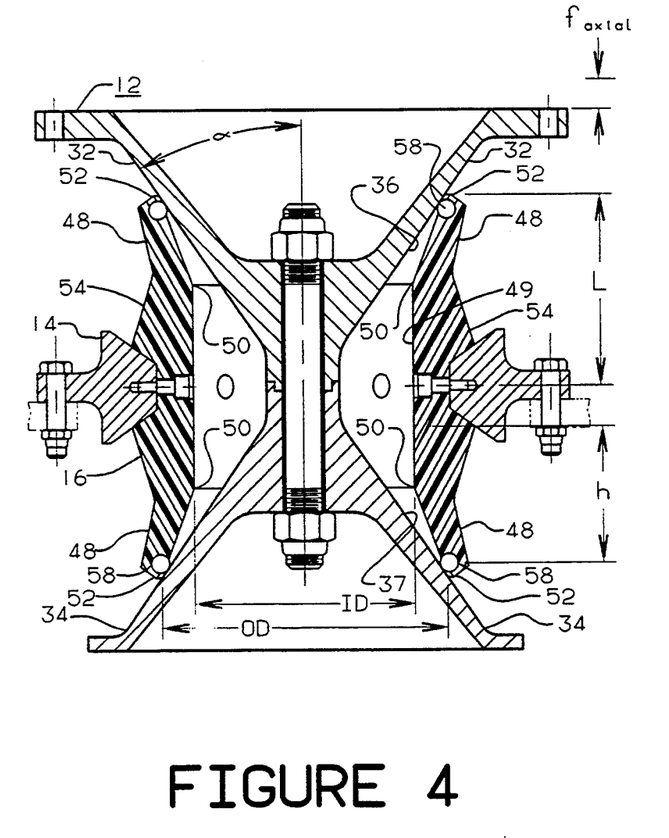
FIG. 4 is a cross-sectional view of the mount assembly of FIG. 3 in its free standing configuration.

As best seen in FIG. 4, retainer 12 includes a generally X-shaped cross section. The X-shaped cross section is formed by outer surfaces 32 and 34 of upper and lower retainers 18 and 20. The outer surfaces 32 and 34 also form contact surfaces 36 and 37 against which resilient member 16 rests. Contact surfaces 36 and 37 are disposed at an angle $\alpha$ from the longitudinal axis X—X of the equipment mount. Angle $\alpha$ is preferably about 35° to provide equal stiffness in the axial and transverse directions. However, to accommodate differing mount capacities, angle α may vary by up to ±15°.

Referring to FIG. 3, base 14 is a center ring 40 surrounding retainer 12 and resilient member 16. To facilitate assembly, the center ring 40 comprises two half rings 42 and 44 clamped together with two screws 46, only one of which is shown. Base 14 further includes a plurality of mounting holes 47 spaced circumferentially around center ring 40 for mounting either load 102 or foundation 104 thereto.

Referring to FIG. 4, resilient member 16 is generally cylindrical and includes a center bore 49 and a kick segment 48 at either end thereof joined to center bore 49 at a knee 50. Each kick segment 48 projects outwardly at an angle relative to the longitudinal axis X—X of the mount. Each end 52 of the kick segments contacts the contact surfaces 36 and 37 when the mount is in its normal static condition supporting load 102 but not subject to shock. As seen in FIG. 3, the thickness of each of the kick segments gradually increases from end 52 to knee 50. Furthermore, the thickness of resilient member 16 gradually increases from knee 50 to a center portion 54 of the resilient member. Resilient member 16 is mechanically fastened to base 14 by a plurality of fasteners such as, for example, socket head cap screws 56 spaced circumferentially around center bore 49.

Figure 5:
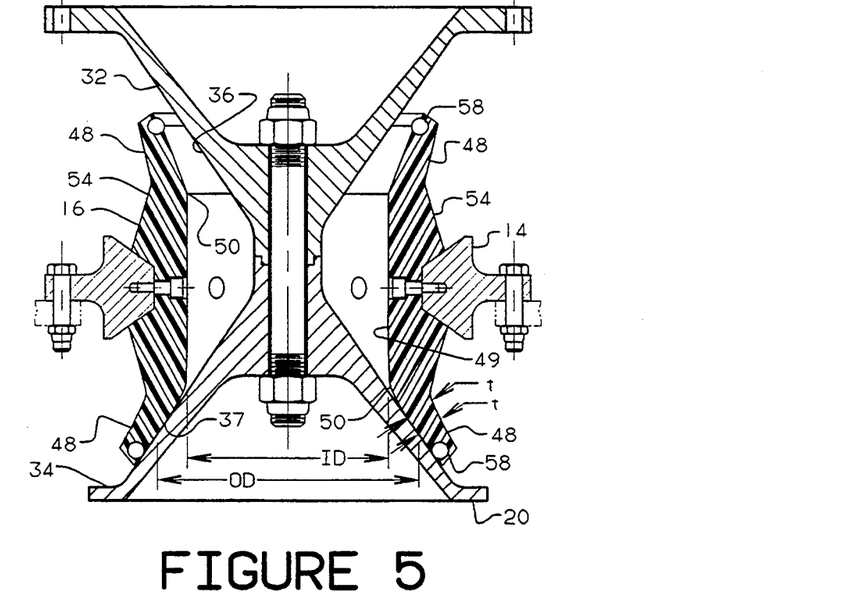
FIG. 5 is a cross-sectional view of the mount assembly of FIGS. 3 and 4 under maximum axial vibration loading condition.
Figure 6:
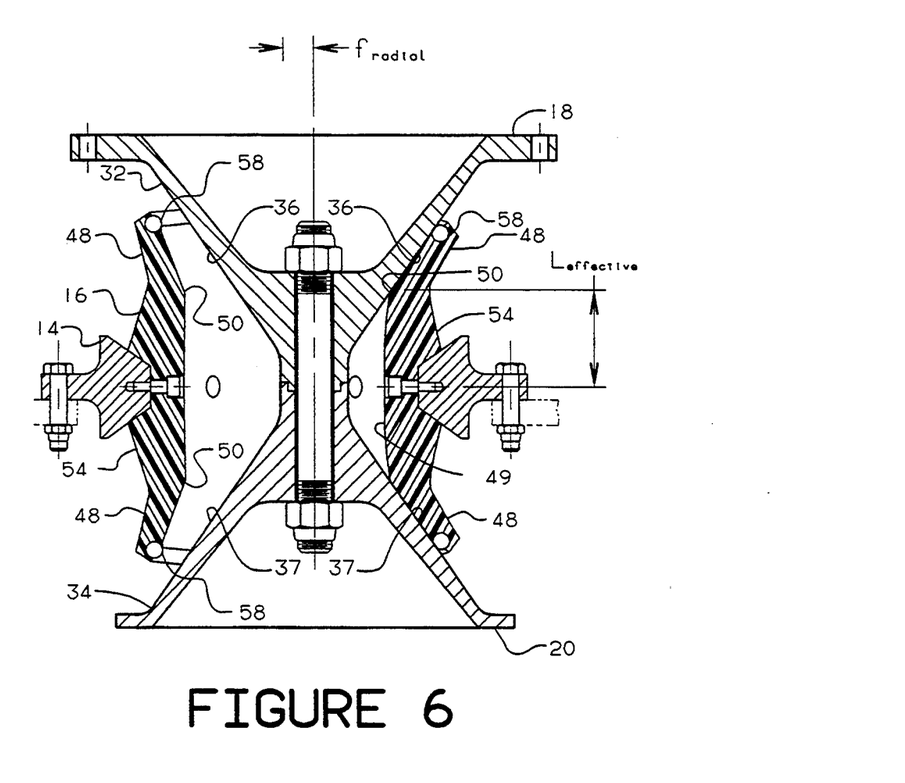
FIG. 6 is a cross-sectional view of the mount assembly of FIGS. 3 and 4 under maximum transverse vibration loading condition.

As seen in FIGS. 5 and 6, under vibration load, one or both of the kick segments 48 are deformed such that a greater portion of one or both of the kick segments contacts the upper or lower retainer contact surfaces 36 and/or 37. Under small amplitude vibration or extremely slow load rates, the resilient member may stick to the contact surfaces rather than slide freely along the surface. To alleviate this problem, a plurality of metallic balls or resilient buttons 58 are embedded in the end 52 of the resilient member kick segments 48. Preferably, twelve to eighteen balls or buttons are spaced circumferentially about the kick segment.

The resilient member is preferably made from any material exhibiting the following physical criteria: a high yield strain limit, approximately 10% or greater; a low creep rate, on the order of 5% of the applied deflection; and chemical inertness. A preferred elastomer is the thermoplastic polyester elastomer sold by E. I. DuPont de Nemours under the trademark HYTREL. Rubber, the prior art material, is not suitable for this application since it does not meet the aforementioned criteria. The remaining structural components are made of cast Nickel-Aluminum-Bronze to Military Standard MIL-B-24480A.

As described below, the physical configuration of the resilient member 16 coupled with the angle α of the contact surfaces relative to longitudinal axis X—X results in an isotropic mount, i.e., a mount having approximately equal stiffness in all directions. Furthermore, as described below, the resilient member is designed to exhibit a first stiffness throughout a predetermined displacement (f) and a significantly increased stiffness thereafter.

As a result of its physical configuration, the portion of resilient member 16 between knee 50 and end 52 behaves similarly to a belleville washer on a tapered surface when loaded from the axial direction and similarly to a cantilever beam when loaded from the transverse direction. The axial stiffness of resilient member 16, i.e., force as a function of displacement, is governed by the following standard equation for the behavior of a belleville washer:

$$P = \frac{4Ef}{M(1-v^2)(O.D.)^2}\left[\left(h - \frac{f}{2}\right)(h-f)t + t^3\right]$$

where:

$$M = \frac{6}{\pi \ln(a)}\left[\frac{(a-1)^2}{a^2}\right]$$

P = Force
a = Outside Diameter/Inside Diameter
v = Poisson's ratio
E = Modulus of Elasticity
f = Displacement
h = Overall Free Height less Thickness
t = Thickness.

Referring to FIGS. 4 and 5, FIG. 4 is a cross-sectional view of the preferred embodiment in its free standing condition. In this free standing condition, kick segments 48 of the resilient member contact the retainer contact surfaces 36 and 37 only at end 52 and ball 58. Thus, the inner (I.D.) and outer (O.D.) diameters of the portion of the resilient member acting as a belleville washer are shown in FIG. 4. However, under axial load, as shown in FIG. 5, a greater portion of the resilient member kick segment contacts the retainer. The effective outer diameter, as seen in FIG. 5, decreases. More significantly, however, the ratio a of the outer diameter to the inner diameter decreases, and thus the stiffness of the resilient member per the above equation increases significantly.

Once the resilient member is displaced so that the knee 50 contacts the retainer contact surface, further loading will tend to contract the resilient member, resulting in a decreasing effective diameter of the portion of the resilient member acting as a belleville washer. Thus, the ratio a of the outer diameter to the inner diameter again is decreased, and the stiffness increases further.

The variance in the thickness of the kick segment also affects the stiffness of the resilient member. The effective thickness of the resilient member as used in the equation is determined by averaging the thicknesses of that portion of the kick segment contacting the retainer. Thus, as an increasing portion of the kick segment contacts the retainer, the effective thickness of the resilient member increases, thereby increasing the stiffness of the resilient member. Thus, it can be seen that upon axial displacement, the decreasing ratio a of the outer diameter to the inner diameter coupled with the increasing thickness of the resilient member results in a significantly increased stiffness.

As previously stated, the resilient member operates similarly to a cantilever beam in the transverse direction. Although operating under a different principle than that of the resilient member in the axial direction, the mount achieves approximately the same increasing stiffness in the transverse directions as in the axial direction. The transverse stiffness of the resilient member, i.e., force as a function of displacement, is governed by the following standard equation for the behavior of a cantilever beam:

$$P = \frac{3EIf}{L^3}$$

where:
P = Force
E = Modulus of Elasticity
f = Displacement
I = Moment of Inertia
L = Length.

The length of the resilient member in its free standing condition is shown in FIG. 4. The mount under a transverse load is shown in FIG. 6. Again, under load, a greater portion of the resilient member kick segment contacts the retainer. The load pulls the resilient member inward, so that the kick segments are drawn toward the center of the mount along the contact surfaces. Thus, when the knee 50 of kick segments 48 contacts the retainer contact surfaces, the effective cantilever length of the resilient member is reduced, thereby increasing the lateral stiffness of the resilient member. Again, once the resilient member is displaced so that the knee 50 contacts the retainer contact surface, a much greater load is required to further deform the resilient member against the retainer, thereby achieving the second, increased stiffness. Furthermore, the deformation of the resilient member against the retainer increases the moment of inertia, also contributing to an increase in stiffness.

Figure 7:
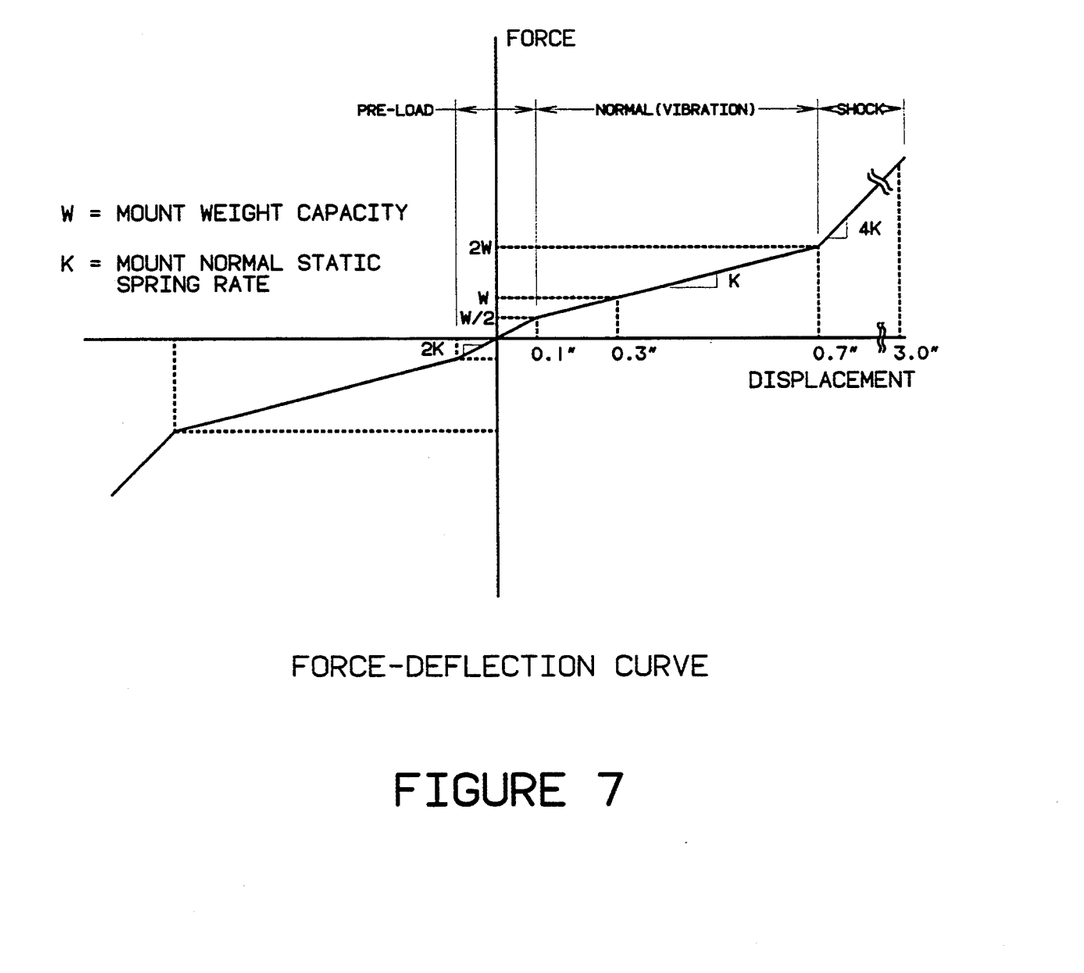
FIG. 7 is a force-deflection curve of the mount assembly of FIGS. 3 through 6.

FIG. 7 is a force-deflection curve of the mount assembly. At small displacements of the resilient member relative to the retainer, i.e., from 0.1 to 0.7 inches, the stiffness of the mount, represented by the slope of the curve, is K. As the load increases to shock loads with a displacement of greater than 0.7 inch, the stiffness of the mount increases significantly to 4K. Thus, the mount is said to exhibit a bilinear stiffness.

It is to be understood that the mount of the present invention will be preloaded to half the weight of load 102 as shown in FIG. 7. The spring constant is 2K in this condition. The preload of half the weight of the load was selected for convenience. This takes out any play in the mount and unloads the bottom half of the mount when loaded by load 102.

Figure 8:
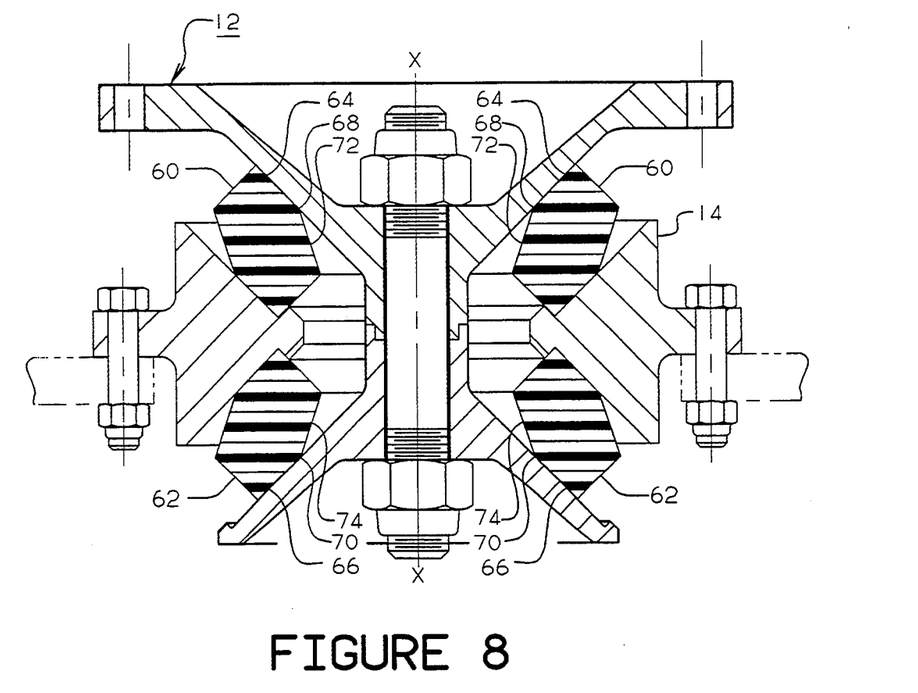
FIG. 8 is a cross-sectional view of an alternate embodiment of the present invention.
Figure 9:
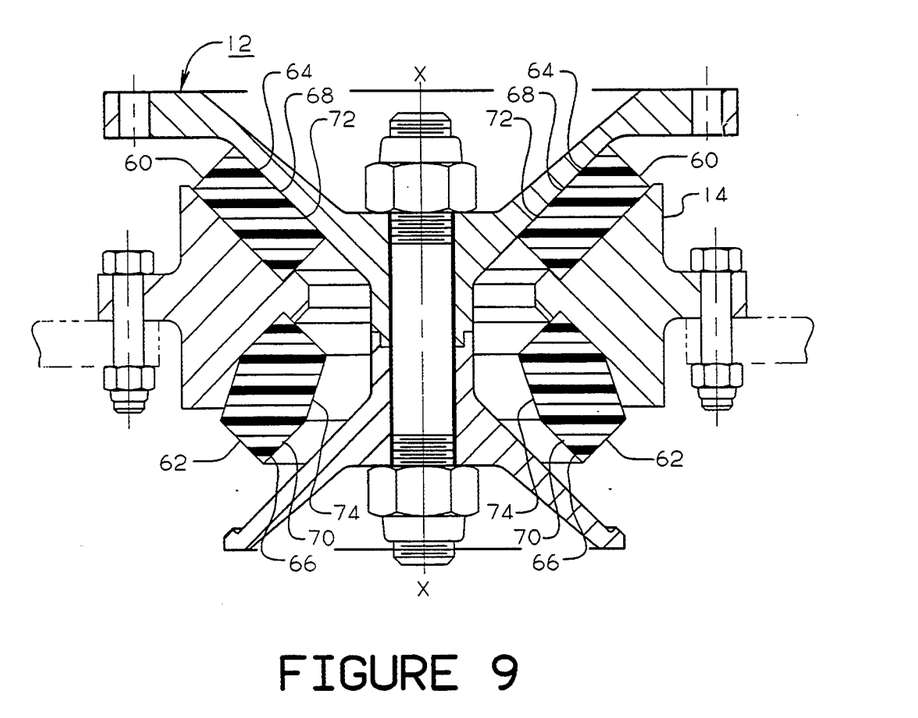
FIG. 9 is a cross-sectional view of the mount assembly of FIG. 8 under maximum axial vibration loading condition.

FIGS. 8 and 9 show an alternate embodiment of the invention. The mount of FIGS. 8 and 9 includes the retainer 12 and the base 14 of the previous embodiment. However, rather than the one-piece resilient member 16, the embodiment of FIGS. 8 and 9 includes upper and lower ring-shaped resilient members 60 and 62. As in the previous embodiment, resilient members 60 and 62 each include a kick segment 64 and 66, respectively, projecting outwardly at an angle relative to the longitudinal axis X—X of the mount. Also included are knees 68 and 70 joining kick segments 64 and 66 to inner surfaces 72 and 74 of resilient members 60 and 62. Unlike the previous embodiment, however, the entire kick segment 64 and 66 contacts the retainer in the unloaded condition, and upon load, the resilient member 60 and/or 62 deforms so that inner surface 72 and/or 74 contacts the retainer. From these two embodiments, it can be seen that the resilient member may be modified and adapted in any suitable manner to achieve the desired bilinear load/deflection curve.

The preferred embodiment of FIG. 3 is designed for a minimum isolator capacity of 5,000 pounds. Smaller capacity mounts are not recommended due to the relative size of the mount and the equipment to be isolated. Because the mount must maintain a minimum size envelope to ensure adequate space for shock excursion, the size of the mount does not necessarily decrease with decreasing capacity. For naval ship applications, the preferred shock and vibration mount capacities are 5,000, 10,000, 25,000, and 50,000 pounds. These capacities can accommodate most equipment or systems of equipment aboard a ship.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

We claim:

1. An equipment mount for isolating equipment from shock loads and acoustic vibrations comprising:
   a foundation to which the equipment mount is secured;
   equipment mounted on the equipment mount;
   a ring-shaped base mounted to the foundation;
   a generally cylindrical retainer with an X-shaped cross section, the retainer including a flange to which the equipment is mounted and a pair of contact surfaces forming the X-shaped cross section and disposed at an angle relative to the axis of the retainer, the retainer being movable relative to the base;
   a generally cylindrical resilient member disposed between the base and the retainer, the base surrounding the resilient member and the retainer, the resilient member including a kick segment at either end thereof, each of the kick segments projecting outwardly at an angle relative to the axis of the resilient member and having an end contacting one of the retainer contact surfaces when free standing;
   said resilient member being deformable under vibration or shock load so that a greater portion of at least one of the kick segments contacts at least one of the retainer contact surfaces to isolate the equipment from the load.

2. The equipment mount according to claim 1, wherein said resilient member is isotropic.

3. The equipment mount according to claim 1, wherein said retainer comprises two cone-shaped elements disposed with the tips thereof adjacent to one another and means for securing the elements together.

4. The equipment mount according to claim 3, wherein each element includes a longitudinal through hole along the axis thereof, the securing means comprising a bolt received in both through holes and a self-locking nut at either end of said bolt.

5. The equipment mount according to claim 3, wherein the outer surfaces of said elements form the X-shaped cross section.

6. The equipment mount according to claim 3, wherein the outer surfaces of said elements form the pair of contact surfaces.

7. The equipment mount according to claim 1, wherein said angle at which said pair of contact surfaces is disposed relative to the axis is 35°.

8. The equipment mount according to claim 1, wherein said angle at which said pair of contact surfaces is disposed relative to the axis is in the range of 20° to 60°.

9. The equipment mount according to claim 1, wherein said resilient member further comprises a free-sliding means for ensuring that each of the retainer members slide freely along said contact surfaces.

10. The equipment mount according to claim 9, wherein said free-sliding means comprises a plurality of metallic balls embedded into the end of each of the resilient member kick segments.

11. The equipment mount according to claim 10, wherein said plurality of metallic balls is uniformly spaced about the circumference of said resilient member kick surface end.

12. The equipment mount according to claim 9, wherein said free-sliding means comprises a plurality of resilient buttons embedded into the end of each of the resilient member kick segments.

13. The equipment mount according to claim 12, wherein said resilient buttons are made of polyurethane.

14. The equipment mount according to claim 12, wherein said plurality of resilient buttons is uniformly spaced about the circumference of said resilient member kick surface end.

15. The equipment mount according to claim 1, wherein said resilient member is made from a thermoplastic polyester elastomer.

16. The equipment mount according to claim 15, wherein said elastomer has a high yield strain limit.

17. The equipment mount according to claim 16, wherein said yield strain limit is approximately 10%.

18. The equipment mount according to claim 15, wherein said elastomer has a low creep rate.

19. The equipment mount according to claim 15, wherein said elastomer is chemically inert.

20. The equipment mount according to claim 1, wherein the resilient member exhibits properties similar to a belleville washer when loaded in the axial direction.

21. The equipment mount according to claim 20, wherein the axial stiffness of the resilient member is governed by the following equation:

$$P = \frac{4Ef}{M(1-v^2)(O.D.)^2}\left[\left(h-\frac{f}{2}\right)(h-f)t + t^3\right]$$

where:

$$M = \frac{6}{\pi \ln(a)}\left[\frac{(a-1)^2}{a^2}\right]$$

P = Force
a = Outside Diameter/Inside Diameter
v = Poisson's ratio
E = Modulus of Elasticity
f = Displacement
h = Overall Free Height less Thickness
t = Thickness.

22. The equipment mount according to claim 20, wherein the resilient member exhibits properties similar to a cantilever beam when loaded in the transverse direction.

23. The equipment mount according to claim 22, wherein the transverse stiffness of the resilient member is governed by the following equation:

$$P = \frac{3EIf}{L^3}$$

where:
P = Force
E = Modulus of Elasticity
f = Displacement
I = Moment of Inertia
L = Length.

24. The equipment mount according to claim 1, wherein the resilient member exhibits properties similar to a cantilever beam when loaded in the transverse direction.

25. The equipment mount according to claim 24, wherein the transverse stiffness of the resilient member is governed by the following equation:

$$P = \frac{3EIf}{L^3}$$

where:
P = Force
E = Modulus of Elasticity
f = Displacement
I = Moment of Inertia
L = Length.

26. The equipment mount according to claim 1, wherein each of the kick segments includes a variable thickness.

27. The equipment mount according to claim 26, wherein the resilient member includes a knee joining each of the kick segments to the resilient member.

28. The equipment mount according to claim 27, wherein as an increasing load is applied to the mount, an increasingly larger portion of at least one of the kick segments contacts the retainer contact surface.

29. The equipment mount according to claim 28, wherein the resilient member has approximately a first stiffness until the knee contacts the retainer contact surface and approximately a second stiffness thereafter.

30. The equipment mount according to claim 28, wherein the thickness of each of the kick segments gradually increases from the end thereof to the knee.

31. The equipment mount according to claim 30, wherein as the increasingly larger portion of at least one of the kick segments contacts the retainer contact surface, the change in thickness of the kick segments results in an increasing stiffness of the resilient member.

32. The equipment mount according to claim 31, wherein the thickness contributes to the axial stiffness according to the following equation:

$$P = \frac{4Ef}{M(1-v^2)(O.D.)^2}\left[\left(h-\frac{f}{2}\right)(h-f)t + t^3\right]$$

where:

$$M = \frac{6}{\pi \ln(a)}\left[\frac{(a-1)^2}{a^2}\right]$$

P = Force
a = Outside Diameter/Inside Diameter
v = Poisson's ratio
E = Modulus of Elasticity
f = Displacement
h = Overall Free Height less Thickness
t = Thickness.

33. The equipment mount according to claim 32, wherein the stiffness according to the equation results in approximately a first stiffness until the knee contacts the retainer contact surface and approximately a second stiffness thereafter.

34. The equipment mount according to claim 1, further comprising securing means for securing the resilient member to the base.

35. The equipment mount according to claim 34, wherein the securing means comprises a plurality of screws.

36. The equipment mount according to claim 1, wherein the base comprises two halves secured together by at least two screws.

37. An equipment mount for isolating equipment from shock loads and acoustic vibrations comprising:
a foundation to which the equipment mount is secured;
equipment mounted on the equipment mount;
a ring-shaped base mounted to the foundation;
a generally cylindrical retainer with a generally X-shaped cross section, the retainer including a flange to which the equipment is mounted and a first and second contact surface disposed at an angle relative to the axis of the retainer, the retainer being surrounded by and movable relative to the base;
a first and second resilient member, the first member being disposed between the base and the first contact surface of the retainer and the second member being disposed between the base and the second contact surface of the retainer, each of the resilient members including a kick segment projecting outwardly at an angle relative to the axis of the resilient member and having an end contacting the retainer contact surface when unloaded;
said first and second resilient members being deformable under load so that a greater portion of the kick segment of at least one of the resilient members contacts at least one of the pair of contact surfaces to isolate the equipment from the load.

38. The equipment mount according to claim 37, wherein said equipment mount is isotropic.

39. The equipment mount according to claim 37, wherein said angle at which said pair of contact surfaces are disposed relative to the axis is 35°.

40. The equipment mount according to claim 37, wherein said angle at which said pair of contact surfaces is disposed relative to the axis is in the range of 20° to 60°.

41. The equipment mount according to claim 37, wherein said resilient member further comprises a free-sliding means for ensuring that each of the resilient members slides freely along said contact surfaces.

42. The equipment mount according to claim 41, wherein said free-sliding means comprises a plurality of metallic balls embedded into the end of each of the resilient member kick segments.

43. The equipment mount according to claim 41, wherein said free-sliding means comprises a plurality of resilient buttons embedded into the end of each of the resilient member kick segments.

44. The equipment mount according to claim 43, wherein said resilient buttons are made of polyurethane.

45. The equipment mount according to claim 37, wherein said resilient member is made from a thermoplastic polyester elastomer.

46. The equipment mount according to claim 37, wherein the resilient member exhibits properties similar to a belleville washer when loaded in the axial direction.

47. The equipment mount according to claim 37, wherein the axial stiffness of the resilient member is governed by the following equation:

$$P = \frac{4Ef}{M(1-\nu^2)(O.D.)^2}\left[\left(h-\frac{f}{2}\right)(h-f)t + t^3\right]$$

where:

$$M = \frac{6}{\pi \ln(a)}\left[\frac{(a-1)^2}{a^2}\right].$$

P = Force
a = Outside Diameter/Inside Diameter
$\nu$ = Poisson's ratio
E = Modulus of Elasticity
f = Displacement
h = Overall Free Height less Thickness
t = Thickness.

48. The equipment mount according to claim 37, wherein the resilient member exhibits properties similar to a cantilever beam when loaded in the transverse direction.

49. The equipment mount according to claim 37, wherein the transverse stiffness of the resilient member is governed by the following equation:

$$P = \frac{3EIf}{L^3}$$

where:
P = Force
E = Modulus of Elasticity
f = Displacement
I = Moment of Inertia
L = Length.

50. The equipment mount according to claim 37, wherein the resilient member includes a knee joining each of the kick segments to the resilient member.

51. The equipment mount according to claim 50, wherein as an increasing load is applied to the mount, an increasingly larger portion of at least one of the kick segments contacts the retainer contact surface.

52. The equipment mount according to claim 51, wherein the resilient member has approximately a first stiffness until the knee contacts the retainer contact surface and approximately a second stiffness thereafter.

53. An equipment mount for isolating equipment from shock loads comprising:
a foundation to which the equipment mount is secured;
equipment mounted on the equipment mount;
a base mounted to the foundation;
a generally cylindrical retainer with an x-shaped cross section, the retainer including a flange to which the equipment is mounted and a pair of contact surfaces forming the x-shaped cross section and disposed at an angle relative to the axis of the retainer, the retainer being movable relative to the base;
a generally cylindrical, isotropic resilient member disposed between the base and the retainer, the base surrounding the resilient member and the retainer, the resilient member including a kick segment at either end thereof, each of the kick segments projecting outwardly at an angle relative to the axis of the resilient member and a knee joining each kick segment to the resilient member, each of the kick segments having an end contacting one of the pair of retainer contact surfaces when unloaded;

said resilient member being deformable so that under an increasing load, an increasingly larger portion of at least one of the kick segments contacts at least one of the retainer contact surfaces to isolate the equipment from the load, the resilient member having a first stiffness until the knee contacts the retainer contact surface and a second stiffness thereafter.

54. An equipment mount for isolating equipment from shock loads comprising:
    a foundation to which the equipment mount is secured;
    equipment mounted on the equipment mount;
    a ring-shaped base mounted to the foundation;
    a generally cylindrical retainer with an x-shaped cross section, the retainer including a flange to which the equipment is mounted and a pair of contact surfaces forming the x-shaped cross section and disposed at an angle relative to the axis of the retainer, the retainer being movable relative to the base;
    a generally cylindrical, isotropic resilient member disposed between the base and the retainer, the base surrounding the resilient member and the retainer, the resilient member including a kick segment at either end thereof, each of the kick segments projecting outwardly at an angle relative to the axis of the resilient member and having an end contacting one of the retainer contact surfaces when unloaded;
    the resilient member having properties similar to that of a belleville spring washer when loaded in the axial direction and that of a cantilever beam when loaded in the transverse direction,
    said resilient member being deformable under load so that a greater portion of the kick segment contacts the contact surface to isolate the equipment from the load.

55. The equipment mount according to claim 54, wherein the axial stiffness of the resilient member is governed by the following equation:

$$P = \frac{4Ef}{M(1-v^2)(O.D.)^2}\left[\left(h - \frac{f}{2}\right)(h-f)t + t^3\right]$$

and wherein the transverse stiffness of the resilient member is governed by the following equation:

$$P = \frac{3EIf}{L^3}$$

where:

$$M = \frac{6}{\pi \ln(a)}\left[\frac{(a-1)^2}{a^2}\right]$$

P = Force
a = Outside Diameter/Inside Diameter
$v$ = Poisson's ratio
E = Modulus of Elasticity
f = Displacement
h = Overall Free Height less Thickness
t = Thickness.
I = Moment of Inertia
L = Length.

* * * * *